US007844956B2

(12) United States Patent
Rojer

(10) Patent No.: US 7,844,956 B2
(45) Date of Patent: Nov. 30, 2010

(54) OBJECT-ORIENTED PROCESSING OF MARKUP

(76) Inventor: Alan S. Rojer, 423 Walton Rd., Maplewood, NJ (US) 07040-1119

( * ) Notice: Subject to any disclaimer, the term of this patent is extended or adjusted under 35 U.S.C. 154(b) by 1320 days.

(21) Appl. No.: 11/286,914

(22) Filed: Nov. 23, 2005

(65) Prior Publication Data
US 2006/0129971 A1   Jun. 15, 2006

Related U.S. Application Data

(60) Provisional application No. 60/631,291, filed on Nov. 24, 2004.

(51) Int. Cl.
*G06F 9/45* (2006.01)
*G06F 9/44* (2006.01)
*G06F 7/00* (2006.01)

(52) U.S. Cl. .................. 717/136; 717/115; 717/116; 717/144; 715/237; 715/239

(58) Field of Classification Search .................. None
See application file for complete search history.

(56) References Cited

U.S. PATENT DOCUMENTS

| | | | |
|---|---|---|---|
| 6,880,125 B2 | 4/2005 | Fry | |
| 6,925,631 B2 | 8/2005 | Golden | |
| 6,996,773 B2 * | 2/2006 | Friedman et al. | 715/240 |
| 7,055,132 B2 * | 5/2006 | Bogdan et al. | 717/116 |
| 7,089,533 B2 | 8/2006 | Vosburgh | |
| 7,165,239 B2 * | 1/2007 | Hejlsberg et al. | 717/114 |
| 7,296,226 B2 * | 11/2007 | Junkermann | 715/249 |
| 2002/0073399 A1 * | 6/2002 | Golden | 717/114 |
| 2003/0110446 A1 * | 6/2003 | Nemer | 715/239 |
| 2003/0172196 A1 * | 9/2003 | Hejlsberg et al. | 709/328 |
| 2004/0015840 A1 | 1/2004 | Walker | |
| 2004/0168124 A1 | 8/2004 | Beisiegel et al. | |
| 2004/0177094 A1 * | 9/2004 | Jacobs et al. | 707/104.1 |
| 2004/0205731 A1 * | 10/2004 | Junkermann | 717/136 |

OTHER PUBLICATIONS

"Compiler support for efficient processing of XML datasets", Li et al., Jun. 2003, pp. 42-52, <http://delivery.acm.org/10.1145/790000/782823/p42-li.pdf>.*

"Knowledge management and XML: derivation of synthetic views over semi-structured data", Cannataro et al., Apr. 2002, pp. 33-36, <http://delivery.acm.org/10.1145/570000/568242/p33-cannataro.pdf>.*

"Methods for the semantic analysis of document markup", Bayerl et al., Nov. 2003, pp. 161-170, <http://delivery.acm.org/10.1145/960000/958250/p161-bayerl.pdf>.*

(Continued)

*Primary Examiner*—Thuy Dao

(57) ABSTRACT

An application-specific client for object-oriented processing of markup includes a model object and a plurality of element objects. The model object is configured to respond to client requests including construct-element, accept-root-element, and accept-root-text. The element objects are configured to respond to client requests including accept-attribute, accept-element, and accept-text. Responses to requests contain application-specific processing as necessary. A driver generates client requests in response to processing of XML markup. An RSS client processes markup describing syndicated web content to HTML markup.

15 Claims, 17 Drawing Sheets

```
// Interface1002...
class Model1006 {
  Element1008* construct_element1012(Text1010 name1018);
  bool accept_element1014(Element1008 *element1020);
  bool accept_text1016(Text1010 text1022);
};
class Element1008 {
  bool accept_attribute1024(Text1010 k1034, Text1010 v1036, Model1006 &model1038);
  bool configure1026(Model1006 &model1040);
  bool accept_element1028(Element1008 *element1042, Model1006 &model1044);
  bool accept_text1030(Text1010 text1046, Model1006 &model1048);
  bool commit1032(Model1006 &model1050);
};
```

OTHER PUBLICATIONS

Lauren Wood, Programming the Web:. The W3C DOM Specification, IEEE Internet Computing, Jan.-Feb. 1999, pp. 48-54.

Fabio Arciniegas, C++ XML, New Riders Publishing, Indianapolis, IN, 2002, ISBN 0-7357-1052-X, pp. 59-79, 99-115.

Fabio Simeoni, David Lievens, Richard Connor, and Paolo Manghi, Language Bindings to XML, IEEE Internet Computing, Jan.-Feb. 2003, pp. 19-27.

Elliotte Rusty Harold and W. Scott Means, XML in a Nutshell, O'Reilly Media, Inc., Sebastopol, CA, 2004, pp. 324-363.

* cited by examiner

FIG. 1

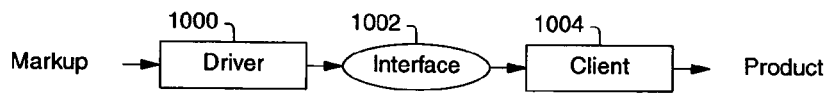

Markup → Driver 1000 → Interface 1002 → Client 1004 → Product

FIG. 2

```
// Interface¹⁰⁰²...
class Model¹⁰⁰⁶ {
   Element¹⁰⁰⁸* construct_element¹⁰¹²(Text¹⁰¹⁰ name¹⁰¹⁸);
   bool accept_element¹⁰¹⁴(Element¹⁰⁰⁸ *element¹⁰²⁰);
   bool accept_text¹⁰¹⁶(Text¹⁰¹⁰ text¹⁰²²);
};
class Element¹⁰⁰⁸ {
   bool accept_attribute¹⁰²⁴(Text¹⁰¹⁰ k¹⁰³⁴, Text¹⁰¹⁰ v¹⁰³⁶, Model¹⁰⁰⁶ &model¹⁰³⁸);
   bool configure¹⁰²⁶(Model¹⁰⁰⁶ &model¹⁰⁴⁰);
   bool accept_element¹⁰²⁸(Element¹⁰⁰⁸ *element¹⁰⁴², Model¹⁰⁰⁶ &model¹⁰⁴⁴);
   bool accept_text¹⁰³⁰(Text¹⁰¹⁰ text¹⁰⁴⁶, Model¹⁰⁰⁶ &model¹⁰⁴⁸);
   bool commit¹⁰³²(Model¹⁰⁰⁶ &model¹⁰⁵⁰);
};
```

FIG. 3

```
<item>
    item¹⁰⁵⁴ = model¹⁰⁵²->construct_element¹⁰¹²("item");
    item¹⁰⁵⁴->configure¹⁰²⁶();
<title>
    title¹⁰⁵⁶ = model¹⁰⁵²->construct_element¹⁰¹²("title");
    title¹⁰⁵⁶->configure¹⁰²⁶();
Example Feed
    title¹⁰⁵⁶->accept_text¹⁰³⁰("Example Feed");
</title>
    title¹⁰⁵⁶->commit¹⁰³²();
    item¹⁰⁵⁴->accept_element¹⁰²⁸(title¹⁰⁵⁶);
<link href="http://example.org/ />"
    link¹⁰⁵⁸ = model¹⁰⁵²->construct_element¹⁰¹²("link");
    link¹⁰⁵⁸->accept_attribute¹⁰²⁴("href", "http://example.org/>");
    link¹⁰⁵⁸->configure¹⁰²⁶();
    link¹⁰⁵⁸->commit¹⁰³²();
    item¹⁰⁵⁴->accept_element¹⁰²⁸(link¹⁰⁵⁸);
</item>
    item¹⁰⁵⁴->commit¹⁰³²();
    model¹⁰⁵²->accept_element¹⁰¹⁴(item¹⁰⁵⁴);
```

FIG. 4

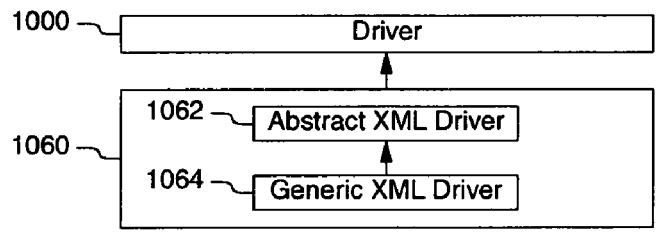

FIG. 5

```
typedef char XML_Char¹⁰⁶⁶;
typedef XML_Char¹⁰⁶⁶* ExpatName¹⁰⁶⁸;
typedef XML_Char¹⁰⁶⁶** ExpatAttributes¹⁰⁷⁰;
typedef XML_Char¹⁰⁶⁶* ExpatBuffer¹⁰⁷²;
```

FIG. 6

```
struct AbstractXmlDriver1062 {
  // data members...
  XML_Parser _parser1074;
  bool _failed1076;
  // factory...
  AbstractXmlDriver1078() : _parser1074(0), _failed1076(0) {}
  virtual ~AbstractXmlDriver1080() {}
  // parse service entry...
  bool parse1082(FILE);
  // expat handler methods...
  static void start_tag_handler1084(void*, ExpatName1068, ExpatAttributes1070);
  static void end_tag_handler1086(void*, ExpatName1068);
  static void characters_handler1088(void*, ExpatBuffer1072, int);
  // pure virtual notifications for specializations...
  void start_tag1090(ExpatName1068, ExpatAttributes1070);
  void end_tag1092(ExpatName1068);
  void characters1094(ExpatBuffer1072, int);
  // etc...
  bool fail1096(Text1010);
};
```

FIG. 7

```
void AbstractXmlDriver1062::start_tag_handler1084(
  void* v,
  ExpatName tag,
  ExpatAttributes attr
)
{
  AbstractXmlDriver1062 *p1104 = (AbstractXmlDriver1062 *) v1098;
  if (!p1104->_failed1076) p1104->start_tag1090(tag1100, attr1102);
}
```

FIG. 8

```
void AbstractXmlDriver^{1062}::end_tag_handler^{1086}(
  void* v,
  ExpatName tag
)
{
  AbstractXmlDriver^{1062} *p^{1110} = (AbstractXmlDriver^{1062} *) v^{1106};
  if (!p^{1110}->_failed^{1076}) p^{1110}->end_tag^{1092}(tag^{1108});
}
```

FIG. 9

```
void AbstractXmlDriver^{1062}::characters_handler^{1088}(
  void* v,
  ExpatBuffer s,
  int length
)
{
  AbstractXmlDriver^{1062} *p^{1118} = (AbstractXmlDriver^{1062} *) v^{1112};
  if (!p^{1118}->_failed^{1076}) p^{1118}->characters^{1094}(s^{1114}, length^{1116});
}
```

FIG. 10

```
bool AbstractXmlDriver¹⁰⁶²::parse¹⁰⁸²(FILE f)
{
    _parser¹⁰⁷⁴ = XML_ParserCreateNS(NULL, ':');
    if (! _parser¹⁰⁷⁴) return fail¹⁰⁹⁶("couldn't create parser");
    XML_SetUserData(_parser¹⁰⁷⁴, (void*) this);
    XML_SetElementHandler(_parser¹⁰⁷⁴, start_tag_handler¹⁰⁸⁴, end_tag_handler¹⁰⁸⁶),
    XML_SetCharacterDataHandler(_parser¹⁰⁷⁴, characters_handler¹⁰⁸⁸);
    const size_t buffer_size¹¹²² = 8192;
    char buffer¹¹²⁴[buffer_size¹¹²²];
    while (1) {
        size_t bytes_read¹¹²⁶ = fread(buffer¹¹²⁴, 1, buffer_size¹¹²², f¹¹²⁰);
        if (ferror(f¹¹²⁰)) {
            fail¹⁰⁹⁶("read error"); break;
        }
        int done¹¹²⁸ = feof(f¹¹²⁰);
        if (!XML_Parse(_parser¹⁰⁷⁴, buffer¹¹²⁴, bytes_read¹¹²⁶, done¹¹²⁸)) {
            fail¹⁰⁹⁶("XML error"); break;
        }
        if (_failed¹⁰⁷⁶) fail¹⁰⁹⁶("processing error"); break;
        if (done¹¹²⁸) break;
    }
    XML_ParserFree(_parser¹⁰⁷⁴);
    _parser¹⁰⁷⁴ = 0;
    return !_failed¹⁰⁷⁶;
}
```

FIG. 11

```
template <struct H¹¹³⁰, struct E¹¹³²>
struct GenericXmlDriver¹⁰⁶⁴ : public AbstractXmlDriver¹⁰⁶²
{
  // data members...
  H¹¹³⁰& _model¹¹³⁴;
  Stack<E¹¹³² *> _stack¹¹³⁶;
  // factory...
  GenericXmlDriver¹¹³⁸(H¹¹³⁰&);
  ~GenericXmlDriver¹¹⁴⁰();
  // AbstractXmlDriver¹⁰⁶² pure virtual member functions...
  void start_tag¹¹⁴²(ExpatName¹⁰⁶⁸, ExpatAttributes¹⁰⁷⁰);
  void end_tag¹¹⁴⁴(ExpatName¹⁰⁶⁸);
  void characters¹¹⁴⁶(ExpatBuffer¹⁰⁷², int);
  // stack operations...
  void push¹¹⁴⁸(E¹¹³²*);
  E¹¹³²* pop¹¹⁵⁰();
  E¹¹³²* top¹¹⁵²();
  bool is_empty¹¹⁵⁴() const;
};
```

*FIG. 12*

```
template <struct H¹¹³⁰, struct E¹¹³²>
void GenericXmlDriver¹⁰⁶⁴<H¹¹³⁰, E¹¹³²>::start_tag¹¹⁴²(
    ExpatName¹⁰⁶⁸ tag¹¹⁵⁶,
    ExpatAttributes¹⁰⁷⁰ attr¹¹⁵⁸
)
{
    E¹¹³²* e¹¹⁶⁰ = _model¹¹³⁴->construct_element¹⁰¹²(tag¹¹⁵⁶);
    if (!e¹¹⁶⁰) {
        fail¹⁰⁹⁶("couldn't construct element");
        return;
    }
    ExpatAttributes¹⁰⁷⁰ s¹¹⁶² = attr¹¹⁵⁸; while (*s¹¹⁶²) {
        Text¹⁰¹⁰ key¹¹⁶⁴ = *s¹¹⁶²++;
        Text¹⁰¹⁰ value¹¹⁶⁶ = *s¹¹⁶²++;
        if (!e¹¹⁶⁰->accept_attribute¹⁰²⁴(key¹¹⁶⁴, value¹¹⁶⁶, _model¹¹³⁴)) {
            fail¹⁰⁹⁶("attribute was declined");
            delete e¹¹⁶⁰;
            return;
        }
    }
    if (!e¹¹⁶⁰->configure¹⁰²⁶(_model¹¹³⁴))
        fail¹⁰⁹⁶("configure failed");
        delete e¹¹⁶⁰;
        return;
    }
    push¹¹⁴⁸(e¹¹⁶⁰);
}
```

FIG. 13

```
template <struct H^1130, struct E^1132>
void GenericXmlDriver^1064<H^1130, E^1132>::end_tag^1144(
   ExpatName^1068 tag
)
{
   E^1132* e^1168 = pop^1150();
   if (!e^1168->commit^1032(_model^1134)) {
      fail^1096("commit failed");
      delete e^1168;
      return;
   }
   if (top^1152()) {
      if (!top^1152()->accept_element^1028(e^1168, _model^1134)) {
         fail^1096("accept failed");
         delete e^1168;
         return;
      }
   }
   else {
      if (!_model^1134.accept_element^1014(e^1168)) {
         fail^1096("model accept failed");
         delete e^1168;
         return;
      }
   }
}
```

FIG. 14

```
template <struct H¹¹³⁰, struct E¹¹³²>
void GenericXmlDriver¹⁰⁶⁴<H¹¹³⁰, E¹¹³²>::characters¹¹⁴⁶(
  ExpatBuffer¹⁰⁷² s,
  int length
)
{
  Text¹⁰¹⁰ t¹¹⁷⁴(s¹¹⁷⁰, length¹¹⁷²);
  if (top¹¹⁵²()) {
    if (!top¹¹⁵²()->accept_text¹⁰³⁰(t¹¹⁷⁴, _model¹¹³⁴)) {
      fail¹⁰⁹⁶("element declined text");
      return;
    }
  }
  else {
    if (!_model¹¹³⁴.accept_text¹⁰¹⁶(t¹¹⁷⁴)) {
      fail¹⁰⁹⁶("model declined text");
      return;
    }
  }
}
```

FIG. 15

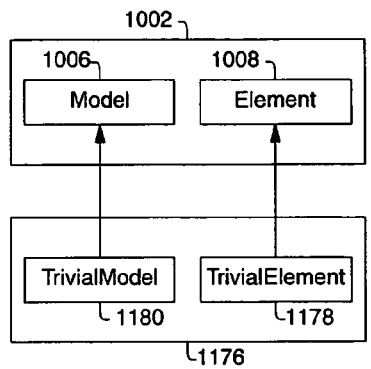

FIG. 16

```
struct TrivialElement1178 {
  virtual bool accept_attribute1182(Text1010, Text1010, TrivialModel1180&) {
    return 1;
  }
  virtual bool configure1184(TrivialModel1180 &) {return 1;}
  virtual bool accept_element1186(TrivialElement1178 *e1188, TrivialModel1180&) {
    delete e1188;
    return 1;
  }
  virtual bool accept_text1190(Text1010, TrivialModel1180 &) {return 1;};
  virtual bool commit1192(TrivialModel1180 &) {return 1;}
};
```

FIG. 17

```
struct TrivialModel1180 {
  virtual TrivialElement1178* construct_element1194(Text1010) {
    return new TrivialElement1178;
  }
  virtual bool accept_element1196(TrivialElement1178 *e1198) {
    delete e1198;
    return 1;
  }
  virtual bool accept_text1200(Text1010) {return 1;}
};
```

FIG. 18

```
// r4s¹²⁰²...
r4sModel¹²⁰⁴ {}
r4sElement¹²⁰⁶ {
  r4sField¹²⁰⁸ {
    r4sTitle¹²¹⁰ {}
    r4sLink¹²¹² {}
    r4sDescription¹²¹⁴ {}
  }
  r4sComposite¹²¹⁶ {
    r4sItem¹²¹⁸ {}
    r4sChannel¹²²⁰ {}
  }
  r4sFeed¹²²² {}
}
r4sHtmlWriter¹²²⁴ {}
```

FIG. 19

```
struct r4sModel¹²⁰⁴ {
  // members..
  r4sFactory¹²²⁶ _factory¹²²⁸;
  Sequence<r4sFeed¹²²²> _feeds¹²³⁰;
  // factory...
  virtual ~r4sModel¹²³²() {/* delete elements of _feeds¹²³⁰ */}
  // Model¹⁰⁰⁶ requests...
  r4sElement¹²⁰⁶ *construct_element¹²³⁴(Text n) {
    r4sElement¹²⁰⁶ *e = _factory¹²²⁸.manufacture(n);
    return e ? e : new r4sField¹²⁰⁸;
  }
  bool accept_root_element¹²³⁶(r4sElement¹²⁰⁶ *e) {
    if (!e->put_model_feed¹²⁵⁰(this)) delete e;
    return 1;
  }
  bool accept_root_text¹²³⁸(Text) {return 1;}
```

FIG. 20

```
struct r4sElement1206 {
  // Element1008 requests...
  virtual bool accept_attribute1240(Text, Text, r4sModel1204&) {return 1;}
  virtual bool configure1242(r4sModel1204&) {return 1;}
  virtual bool accept_element1244(r4sElement1206 *e, r4sModel1204&) {
    delete e; return 1;
  }
  virtual bool accept_text1246(Text, r4sModel1204&) {return 1;}
  virtual bool commit1248(r4sModel1204&) {return 1;}
  // double-dispatch accumulator methods...
  virtual bool put_model_feed1250(r4sModel1204*)   {return 0;}
  virtual bool put_feed_channel1252(r4sFeed1222*)  {return 0;}
  virtual bool put_channel_item1254(r4sChannel1220*)   {return 0;}
  virtual bool put_field1256(r4sComposite1216*)   {return 0;}
};
```

FIG. 21

```
struct r4sFeed1222: public r4sElement1206 {
  Sequence<r4sChannel1220> _channels1258;
  virtual bool accept_element1260(r4sElement1206 *e, r4sModel1204 &) {
    if (!e->put_feed_channel1252(this)) delete e;
    return e;
  }
  virtual bool put_model_feed1262(r4sModel1204 *m) {
    m->_feeds1230.append(this);
    return 1;
  }
  virtual ~r4sFeed1264 { /* delete constituents of _channels1258 */ }
};
```

*FIG. 22*

```
struct r4sComposite¹²¹⁶: public r4sElement¹²⁰⁶ {
  // members...
  r4sTitle¹²¹⁰ *_title¹²⁶⁶;
  r4sLink¹²¹² *_link¹²⁶⁸;
  r4sDescription¹²¹⁴ *_description¹²⁷⁰;
  // factory...
  ~r4sComposite¹²⁷² {
    delete _description¹²⁷⁰;
    delete _link¹²⁶⁸;
    delete _title¹²⁶⁶;
  }
};

struct r4sChannel¹²²⁰: public r4sComposite¹²¹⁶ {
  Sequence<r4sItem¹²¹⁸> _items¹²⁷⁴;
  virtual bool accept_element¹²⁷⁶(r4sElement¹²⁰⁶ *e, r4sModel¹²⁰⁴ &); {
    if (e->put_channel_item¹²⁵⁴(this)) return 1;
    if (e->put_field¹²⁵⁶(this)) return 1;
    delete e;
    return 1;
  }
  virtual bool put_feed_channel¹²⁷⁸(r4sFeed¹²²² *f) {
    f->_channels¹²⁵⁸.append(this);
    return 1;
  }
  virtual ~r4sChannel¹²⁸⁰ { /* delete constituents of _items¹²⁷⁴ */ }
};

struct r4sItem¹²¹⁸: public r4sComposite¹²¹⁶ {
  virtual bool accept_element¹²⁸²(r4sElement¹²⁰⁶ *e, r4sModel¹²⁰⁴ &) {
    if (!e->put_field¹²⁵⁶(this)) delete e;
    return 1;
  }
  virtual bool put_channel_item¹²⁸⁴(r4sChannel¹²²⁰ *c) {
    c->_items¹²⁷⁴.append(this);
    return 1;
  }
};
```

FIG. 23

```
struct r4sField[1208]: public r4sElement[1206] {
  // member...
  Text _text[1286];
  // Element[1008] specialization(s)...
  virtual bool accept_text[1288](Text, r4sModel[1204] &);
};

struct r4sTitle: public r4sField[1208] {
  virtual bool put_field[1290](r4sComposite[1216] *c) {
    c->_title[1266] = this;
    return 1;
  }
};

struct r4sLink: public r4sField[1208] {
  virtual bool put_field[1292](r4sComposite[1216] *c) {
    c->_link[1268] = this;
    return 1;
  }
};

struct r4sDescription: public r4sField[1208] {
  virtual bool put_field[1294](r4sComposite[1216] *c) {
    c->_description[1270] = this;
    return 1;
  }
};
```

FIG. 24

```
struct r4sHtmlWriter¹²²⁴ {
  r4sHtmlWriter¹²⁹⁶(const r4sModel¹²⁰⁴ &m, TextSink &) {
    /* format HTML top boilerplate */
    foreach (f in m._feeds¹²³⁰) view¹²⁹⁸(f);
    /* format HTML bottom boilerplate */
  }
  bool view¹²⁹⁸(const r4sFeed¹²²² *f) {
    foreach (c in f->_channels¹²⁵⁸) view¹³⁰⁰(c);
  }
  bool view¹³⁰⁰(const r4sChannel¹²²⁰ *c) {
    /* format _link¹²⁶⁸, _title¹²⁶⁶, and _description¹²⁷⁰ */
    foreach (i in c->_items¹²⁷⁴) view¹³⁰²(i);
  }
  bool view¹³⁰²(const r4sItem¹²¹⁸ *i) {
    /* format _link¹²⁶⁸, _title¹²⁶⁶, and _description¹²⁷⁰ */
  }
};
```

FIG. 25

```
int main¹³⁰⁴(int argc, char **argv)
{
  r4sModel¹²⁰⁴ model¹³⁰⁶;
  GenericXmlDriver¹⁰⁶⁴<r4sModel¹²⁰⁴, r4sElement¹²⁰⁶> driver¹³⁰⁸(model¹³⁰⁶);
  int arg=1; while (arg < argc) {
    FILE *f = fopen(argv[arg++]);
    driver¹³⁰⁸.parse¹⁰⁸²(f);
    fclose(f);
  }
  TextFileSink sink(stdout);
  r4sHtmlWriter¹²²⁴ writer¹³¹⁰(model¹³⁰⁶, sink);
  return 0;
}
```

FIG. 26

```
<rss>
  <channel>
    <title>One Channel</title>
    <link>http://one.demo/channel-1/</link>
    <description>Our first RSS Channel</description>
    <generator>Hand-crafted RSS code</generator>
    <lastBuildDate>Sun Nov 20 16:15:20 EST 2005</lastBuildDate>
    <item>
      <title>Our First Item</title>
      <link>http://one.demo/item-2005-11-20-001/</link>
      <pubDate>Sun Nov 20 16:17:51 EST 2005</pubDate>
<description>
The first RSS item we ever published!  Don't miss this!
</description>
    </item>
    <item>
      <title>Our Second Item</title>
      <pubDate>Sun Nov 20 16:18:09 EST 2005</pubDate>
      <link>http://one.demo/item-2005-11-20-002/</link>
<description>
Our second RSS item.  Not as cool as the first one.
</description>
    </item>
  </channel>
</rss>
```

FIG. 27

```
<html>
<head>
  <title>r4s Feed Summary</title>
</head>
<body>
<h1>r4s Feed Summary</h1>
<h2><a href='http://one.demo/channel-1/'>One Channel</a></h2>
<p>Our first RSS Channel</p>
<h3>
<a href='http://one.demo/item-2005-11-20-001/'>Our First Item</a>
</h3>
<p>
The first RSS item we ever published!  Don't miss this!
</p>
<h3>
<a href='http://one.demo/item-2005-11-20-002/'>Our Second Item</a>
</h3>
<p>
Our second RSS item.  Not as cool as the first one.
</p>
</body>
</html>
```

OBJECT-ORIENTED PROCESSING OF MARKUP

CROSS-REFERENCE TO RELATED APPLICATIONS

This application claims the benefit of Patent Provisional Application Ser. No. 60/631,291, filed on Nov. 24, 2004.

BACKGROUND OF THE INVENTION

This invention relates to application-specific object-oriented processing of markup, including but not limited to the Extensible Markup Language (XML).

Object-oriented programming has been embraced by many programmers seeking to enhance their productivity. A useful introduction to object-oriented programming may be found in the book "Object-Oriented Analysis and Design with Applications, 2nd Edition," by Grady Booch, Benjamin/Cummings, 1994, ISBN 0-8053-5340-2. Another useful object-oriented programming text is "Design Patterns: Element of Reusable Object-Oriented Software," by Erich Gamma, Richard Helm, Ralph Johnson, and John Vlissides, Addison-Wesley, 1995, ISBN 0-201-63361-2. For the language programming language C++, which will be utilized in this disclosure, a useful reference is "The C++ Programming Language, 3rd Edition," by Bjarne Stroustup, Addison-Wesley, 1997, ISBN 0-201-88954-4. Each of these reference is incorporated herein by reference.

In object-oriented programming, an object encapsulates both data and operations. An object is an instance of one or more classes. A class defines data and operations which are available for objects which are instances of the class. An element of data defined in a class is denoted a member. Each distinct object from a class has its own distinct instance of each member, except where members are explicitly denoted as class members, in which case all class instances share the same data instance. An operation defined for an object from a class is denoted a member function. A member function may be invoked for an object which is an instance of the class in which it is defined; the member function may make use of the member data which is specific to the particular object for which the member function was invoked.

An object-oriented programming language includes facilities for class definition as well as facilities for creating objects, invoking operations on objects, and destroying objects. Some popular object-oriented programming languages are C++, Java, and C#.

An application is a computer program that carries out some useful task on behalf of a user. Applications are oriented towards such fields as business, engineering, entertainment, and media production. An object-oriented application uses application-specific classes to represent entities that are meaningful in the context of the application. Thus a business application might use application-specific classes to represent customers, purchase orders, inventory items, and shipments. In an object-oriented application, class facilities are used to instantiate application-specific objects, which are then utilized to carry out operations which are meaningful in the context of the application.

Among the important characteristics of application-specific objects are associations which represent relationships between application-specific objects. For example, in a business application, an application-specific object representing a purchase order might be associated with an application-specific object representing a customer. Similarly, a customer object could be associated with a plurality of purchase-order objects. Such associations may be realized by use of pointer or references members. For example, a purchase order object could contain a pointer member which indicates the subject object. A collection of application-specific objects configured to represent application-specific relationships is denoted an application-specific object-oriented data structure. An application-specific object-oriented data structure is a useful component in an application. Indeed an application is often most easily understood as a process in which an application-specific object-oriented data structure is created from an stored representation, operations reflecting meaningful activities in the application context are performed on the data structure, and a stored representation is written. The stored representations which are read and written by an application are often in the form of markup.

An application-specific data structure typically includes numerous application-specific objects, organized according to one or more schemes that reflect the requirements of the application. It is often convenient to encapsulate the application-specific object-oriented data structure in a single model object. The model object's class or classes may define one or more members which reference application-specific objects singly or in collections, and one or more member functions, which facilitate random access to particular application-specific objects. For example, a model class in a business application might define a member function in which a customer object is provided in response to a textual customer number. Such a model class might further provide the entire collection of customers, or a collection of purchase orders which have been received but not yet shipped. The particular members and member functions of a model class are designed to facilitate the performance of the tasks that are the purpose of the application.

The stored representations which are read and written by applications are often in the form of markup. Of particular importance for markup is XML, which is in wide use. A useful reference for XML is the book "XML In a Nutshell, 3rd Edition", by Elliotte Rusty Harold and W. Scott Means, published by O'Reilly, 2004, ISBN 0-596-00764-7, incorporated herein by reference. Many applications are required to read or write XML or other markup languages.

Markup consists of hierarchically organized tagged elements. A tagged element typically consists of a start tag, an optional body, and an end tag. Where the body is absent, the start tag and end tag may be combined into a single tag. The start tag includes a textual tag name and optional attributes. The tag name describes the tagged element. Each attribute includes a textual key and a textual value. Attributes may provide additional descriptive information about the tagged element. The body of the tagged element may contain both instances of textual content and nested tagged elements. The end tag concludes the tagged element.

The hierarchical organization of markup is reflected in the nesting of tagged elements. The body of a tagged element may contain nested tagged elements as well as textual content. The containing tagged element is denoted the parent. The nested tagged element is denoted the child. A tagged element which lacks a parent is denoted a root. In XML, a well-formed document is required to contain exactly one root tagged element.

An application programming interface (APT) specifies an interface to computational services. An API permits decomposition of a programming task between the provider of the API and the consumer of the API. As long as clients and providers adhere to the API, diverse clients may make use of a single provider. Likewise, providers may be freely interchanged without affecting clients. APIs are available which facilitate markup processing. Although markup may be processed by any programming language, object-oriented languages including Java, and scripting languages includes Perl and Python have been most widely used. However C and especially C++ are also well-suited to markup processing. The aforementioned XML book covers Java programming interfaces. A reference for C++ programming interfaces may be found in the book "C++ XML", by Fabio Arciniegas, published by New Riders, 2002, ISBN 0-7357-1052-X, incorporated herein by reference.

The oldest XML API is the Document Object Model (DOM). DOM processes markup to a tree-like data structure. DOM is a W3C standard which is documented online at <http://www.w3.org/DOM/>. DOM presents markup as an object-oriented data structure; however the objects of the presentation faithfully reflect the structure and properties of the markup. DOM does not provide application-specific objects for business, engineering, entertainment, or artistic applications.

An alternative API to DOM is SAX, the Simple API for XML. SAX processes markup to a series of event notifications, where the event notifications correspond to particular subelements of the processed markup. Expat is a open-source implementation of the SAX API, originally written by James J. Clark, with contributions by David Megginson and David Brownell. Expat is in wide use. Expat materials may be found online at the official Expat website, http://sax.source-forge.net/. Expat does not provide object-oriented facilities for markup processing other than the SAX processor itself, the operation of which is controlled using an object-oriented interface.

SAX and DOM are of limited benefit to a programmer who desires an application-specific object-oriented data structure, consisting of application-specific objects interconnected to reflect properties and associations that are natural to the application. To build an application-specific object-oriented data structure from SAX notifications, a programmer must maintain complex context to interpret the events in terms of the ongoing construction of the desired structure. In DOM, the programmer must systematically traverse a complex tree structure, generating a parallel structure consisting of application-specific objects. In both SAX and DOM, the programmer must invest significant additional effort to construct the desired application-specific object-oriented data structure.

Thus, it would be advantageous to reduce the effort required for the construction of an application-specific object-oriented data structure from markup. It would also be advantageous to maximize flexibility in the structure and function of the application-specific objects which are constructed corresponding to tagged elements.

SUMMARY

An application-specific client for object-oriented processing of markup includes a model object and a plurality of element objects. The model object is configured to respond to client requests including construct-element, accept-root-element, and accept-root-text. The element objects are configured to respond to client requests including accept-attribute, accept-element, and accept-text. Responses to requests contain application-specific processing as necessary. A driver generates client requests in response to processing of XML markup. An RSS client processes markup describing syndicated web content to HTML markup.

BRIEF DESCRIPTION OF DRAWINGS

FIG. 1 depicts an exemplary embodiment of a system for processing markup.

FIG. 2 depicts an exemplary embodiment of the interface for object-oriented processing of markup.

FIG. 3 demonstrates the processing of markup to requests in the interface.

FIG. 4 depicts an exemplary embodiment of an xml-driver.

FIG. 5 depicts an exemplary embodiment of typedefs which relate expat interface parameters to functional names.

FIG. 6 depicts an exemplary embodiment of a class abstract-xml-driver.

FIG. 7 depicts an exemplary embodiment of an abstract-xml-driver class function start-tag-handler.

FIG. 8 depicts an exemplary embodiment of an abstract-xml-driver class function end-tag-handler.

FIG. 9 depicts an exemplary embodiment of an abstract-xml-driver class function characters-handler.

FIG. 10 depicts an exemplary embodiment of an abstract-xml-driver member function parse.

FIG. 11 depicts an exemplary embodiment of a template class generic-xml-driver.

FIG. 12 depicts an exemplary embodiment of a generic-xml-driver member function start-tag.

FIG. 13 depicts an exemplary embodiment of a generic-xml-driver member function end-tag.

FIG. 14 depicts an exemplary embodiment of a generic-xml-driver member function characters.

FIG. 15 depicts an exemplary embodiment of a trivial client implementation of the interface.

FIG. 16 depicts an exemplary embodiment of the trivial element class which provides a client implementation of the element interface.

FIG. 17 depicts an exemplary embodiment of the trivial model class which provides a client implementation of the model interface.

FIG. 18 depicts an exemplary embodiment of a module providing a client implementation of the interface suitable for an application processing a subset of RSS.

FIG. 19 depicts an exemplary embodiment of a RSS model class.

FIG. 20 depicts an exemplary embodiment of a RSS element class.

FIG. 21 depicts an exemplary embodiment of a RSS feed class.

FIG. 22 depicts an exemplary embodiment of a RSS composite class and its specializations.

FIG. 23 depicts an exemplary embodiment of a RSS field class and its specializations.

FIG. 24 depicts an exemplary embodiment of a RSS HTML writer class.

FIG. 25 depicts an exemplary embodiment of an application which reads RSS and writes HTML.

FIG. 26 depicts an exemplary embodiment of a sample RSS document.

FIG. 27 depicts an exemplary embodiment of the HTML produced by the rss-html-writer operating on the sample RSS document.

DETAILED DESCRIPTION

1 Object-Oriented Interface

FIG. 1 depicts an examplary embodiment of a system for processing markup. The markup is processed by a driver 1000, which reads the markup, detects tagged elements, attributes, and intances of textual content, and generates a sequence of requests. The requests are specified by an interface 1002. A client 1004 responds to the requests. In consequence of the responses of the client 1004 to the requests of the driver 1000, an application-specific object-oriented data structure may be produced.

FIG. 2 depicts an examplary embodiment of the interface 1002. The interface 1002 specifies a collection of requests which govern interactions between the driver 1000, which generates the requests, and the client 1004, which responds to the requests. The client 1004 includes a single instance of a class model 1006 and one or more instances of a class element 1008. An instance of the model 1006 encapsulates the application-specific object-oriented data structure which is produced by processing the markup. The model 1006 corresponds to the totality of the processed markup, including one or more documents. An instance of the element 1008 corresponds to a particular tagged element; typically an instance of the element 1008 represents an entity which is meaningful in the context of an application. The interface 1002 also makes use of a scalar class text 1010, an instance of which represents textual content and other textual data.

1.1 Model Requests

An instance of the model 1006 encapsulates the application-specific object-oriented data structure which is produced by processing the markup. The model instance corresponds to the totality of the processed markup, including one or more documents. The model instance responds to a request construct-element 1012, which is requested when a start tag is detected in the markup. The model instance responds to a request accept-root-element 1014, which is requested when a root instance of the element 1008 has been successfully processed from markup. The model instance responds to a request accept-root-text 1016, which is requested when root textual content is detected in the markup.

An instance of the model 1006 responds to the request construct-element 1012. The construct-element 1012 is requested when a start tag is detected in the markup. The construct-element 1012 is supplied with an argument name 1018, a instance of text 1010 which indicates the tag name. The construct-element 1012 responds with a newly constructed instance of the element 1008, unless the request is invalid, in which case the construct-element 1012 returns null.

An instance of the model 1006 responds to the request accept-root-element 1014. The accept-root-element 1014 is requested when a root element 1008 has been successfully processed from markup. In XML, a single root element 1008 is permitted in a document but the interface 1002 permits the model 1006 to enforce or relax that requirement. The accept-root-element 1014 is supplied with an argument element 1020, an instance of the element 1008. The accept-root-element 1014 returns a boolean value, indicating whether the supplied element 1020 was acceptable to the responsive instance of the model 1006. The responsive model instance assumes responsibility for the eventual deletion of the supplied element 1020.

An instance of the model 1006 responds to the request accept-root-text 1016. The accept-root-text 1016 is requested when root textual content is processed from the markup. Root text is textual content which is outside of any tagged element. Often such text is ignored, but the model instance may enforce any policy. The accept-root-text 1016 is supplied with an argument text 1022, a instance of text 1010, representing the root textual content. The accept-root-text 1016 returns a boolean value, indicating whether the supplied text 1022 was acceptable to the responsive model instance.

1.2 Element Requests

An instance of the element 1008 corresponds to a tagged element. A tagged element includes a start tag, optional attributes, an optional body containing nested tagged elements and text, and an end tag. The element instance responds to a request accept-attribute 1024, which is requested when an attribute is detected in the start tag of the corresponding tagged element. The element instance responds to a request configure 1026, which is requested after all the attributes in the start tag have been processed, but before any text or tagged elements have been processed from the body of the corresponding tagged element. The element instance responds to a request accept-element 1028, which is requested when a nested tagged element has been successfully processed from the body of the corresponding tagged element. The element instance responds to a request accept-text 1030, which is requested when textual content has been processed from the body of the corresponding tagged element. The element instance responds to a request commit 1032, which is requested when the end tag of the corresponding tagged element has been detected.

An instance of the element 1008 responds to the request accept-attribute 1024. The accept-attribute 1024 is requested when an attribute is detected in the start tag of the corresponding tagged element. The accept-attribute 1024 is provided with an argument key 1034, of text 1010, representing the attribute key. The accept-attribute 1024 is provided with an argument value 1036, of text 1010, representing the attribute value. The accept-attribute 1024 is provided with an argument model 1038, an instance of the model 1006, encapsulating the application-specific data structure. The accept-attribute 1024 returns a boolean value, indicating whether the attribute was successfully processed. The responsive element instance may use the return value to indicate. whether a supplied attribute is recognized or whether any externalities implied by the supplied attribute have been satisfied.

An instance of the element 1008 responds to the request configure 1026. The configure 1026 is requested after all the attributes in the start tag have been detected, but before any text or tagged elements have been processed from the body of the corresponding tagged element. The configure 1026 is provided with an argument model 1040, an instance of the model 1006, encapsulating the application-specific data structure. The configure 1026 returns a boolean value indicating whether the previously supplied attributes, if any, are satisfactory for the purposes of the responsive element instance. The responsive element instance may use this request to determine whether any required attributes have been provided.

An instance of the element 1008 responds to the request accept-element 1028. The accept-element 1028 is requested when a nested tagged element has been successfully processed from the body of the corresponding tagged element. The accept-element 1028 is supplied with an argument element 1042, an instance of the element 1008, corresponding to the nested tagged element, which is subject to acceptance. The accept-element 1028 is supplied with an argument model 1044, an instance of the model 1006, encapsulating the application-specific data structure. The accept-element 1028 returns a boolean value, indicating whether the supplied element 1042 is satisfactory for containment by the responsive instance of the element 1008. The responsive element instance assumes responsibility for the eventual deletion of the supplied element 1042.

An instance of the element 1008 responds to the request accept-text 1030. The accept-text 1030 is requested when textual content has been processed from the body of the corresponding tagged element. The accept-text 1030 is supplied with an argument text 1046, an instance of text 1010, representing the textual content. The accept-text 1030 is supplied with an argument model 1048, an instance of the model 1006, encapsulating the application-specific data structure. The accept-text 1030 returns a boolean value, indicating whether the supplied text 1010 is satisfactory for containment by the responsive element instance.

An instance of the element 1008 responds to the request commit 1032. The commit 1032 is requested when the end tag of the corresponding tagged element has been detected. The commit 1032 is supplied with an argument model 1050, an instance of the model 1006, encapsulating the application-specific data structure. The accept-text 1030 returns a boolean value, indicating whether the responsive element instance is in a satisfactory condition for ending. The responsive element instance may use this request to determine whether any required subelements have been provided.

2 Demonstration

FIG. 3 demonstrates the processing of XML markup to requests in the interface 1002. XML markup is shown in a bold font, left-justified; interfaces requests are shown indented, in a normal font.

A first line of markup presents a start tag of a root tagged element. The start tag "<item>" is processed to generate the request construct-element 1012, which is requested to a demo-model 1052. The demo-model 1052 is an instance of the model 1006. The request returns a demo-item 1054, an instance of the element 1008. For simplicity, the demo-item 1054 and subsequent returned elements from the construct-element 1012 are shown here as if they were assigned to variables. More typically, the newly constructed elements would be pushed onto a stack. There are no attributes to be supplied to the demo-item 1054, so the configure 1026 is requested of the demo-item 1054, providing a notification to the demo-item 1054 that all attributes have been processed.

A second line of markup presents a start tag of a nested tagged element. The start tag "<title>" is processed to generate the request construct-element 1012, which is directed to the demo-model 1052. The request returns a demo-title 1056, an instance of the element 1008. There are no attributes to be supplied to the demo-title 1056, so the configure 1026 is requested of the demo-title 1056, A third line of markup presents textual content. The textual content is processed to generate the accept-text 1030, which is directed to the demo-item 1054.

A fourth line of markup presents an end tag of a nested tagged element. The end tag "</title>" is processed to generate the request commit 1032, which is directed to the demo-title 1056. The demo-title 1056, fully processed, is now presented to the containing element. A request accept-element 1028 directed to the demo-item 1054 presents the demo-title 1056.

A fifth line of markup presents a start tag of a nested tagged element, including an attribute. The start tag "<link>" is processed to generate the request construct-element 1012, which is directed to the demo-model 1052. The request returns a demo-link 1058, an instance of the element 1008. The attribute "href" is presented to the newly constructed demo-link 1058 in a request accept-attribute 1024. The configure 1026 is then requested of the demo-link 1058. The end tag is immediately detected; a request commit 1032 is directed to the demo-link 1058, following which a request accept-element 1028 is directed to the demo-item 1054, presenting the demo-link 1058.

A sixth line of markup presents an end tag of the root tagged element, corresponding to the demo-item 1054. A request commit 1032 is directed to the demo-item 1054, and the demo-item 1054 is presented to the demo-model 1052 in a request accept-root-element 1014.

3 XML Driver for Interface

FIG. 4 depicts an examplary embodiment of an xml-driver 1060. The xml-driver 1060 is a refinement of the driver 1000, specifically adapted for processing XML markup. The xml-driver 1060 processes XML markup and dispatches client requests in the interface 1002. To process XML markup, the xml-driver 1060 uses the open-source XML parser expat, by James J. Clark. Expat is itself a specialized provider of an abstract markup programmer's interface, SAX, which is a simple stream-oriented interface that specifies notifications to the parse client on start tag, end tag, and textual content. The xml-driver 1060, acting as the client of expat, provides buffers of markup to expat, receiving from expat notifications of start tags, end tags, and textual content as expat processes the supplied markup. The xml-driver 1060 transforms expat notifications to client requests in the interface 1002.

The xml-driver 1060 is partitioned between an abstract-xml-driver 1062, and a generic-xml-driver 1064. The abstract-xml-driver 1062 interfaces directly with expat. The abstract-xml-driver 1062 is independent of particular client implementations of the model 1006 and the element 1008. The abstract-xml-driver 1062 specifies pure virtual notification methods which its specializations must provide to respond to expat notifications.

The generic-xml-driver 1064 specializes the abstract-xml-driver 1062. The generic-xml-driver 1064 is a template class which is parameterized by client implementations of the model 1006 and the element 1008. The generic generic-xml-driver 1064 specializes the virtual member functions of the abstract-xml-driver 1062 which represent the expat notifications; the expat notifications are converted to client requests in the interface 1002, specialized to the particular client implementations of the model 1006 and the element 1008 by which the generic-xml-driver 1064 is parameterized.

Before plunging into the details of the abstract-xml-driver 1062 and the generic-xml-driver 1064, there is a technicality pertaining to expat notifications. Expat makes extensive use of the XML_Char typedef throughout its programmer's interface; which may be a 16 or 8 bit encoded datum. In case the data is encoded using UTF-8, the XML_Char is defined to be the usual C char. Conceptually, in the various notifications expat provides, there are names, attributes, and buffers. Expat interfaces simply use variants of the indirect references to XML_Char for all these elements. In the particular embodiment, the names, attributes and buffers are distinguished for clarity.

FIG. 5 depicts an examplary embodiment of typedefs which relate expat interface parameters to functional names. The typedef XML_Char 1066 is defined for reference purposes as a C char, but in an alternative embodiment the XML_Char could be defined as a 16-bit short or even something larger. The expat-name 1068 is defined as a pointer to a XML_Char, which is guaranteed by expat to behave like a typical C string; i.e., a null-terminated sequence of XML_Char. The expat-attributes 1070 is defined as a pointer to a pointer to a XML_Char; expat provides a null terminated array of pointers to typical C strings. This array is actually a flattened sequence of pairs, corresponding to attribute key, value pairs. The expat-buffer 1072 is defined as a pointer to XML_Char but the expat-buffer 1072 is not a typical C string in that it's not guarenteed to be null-terminated. Hence in any interface providing a expat-buffer 1072 there is a length parameter indicating the length of the data in the buffer.

3.1 Abstract XML Driver

FIG. 6 depicts an examplary embodiment of the abstract-xml-driver 1062. The abstract-xml-driver 1062 encapsulates the expat XML parser. The abstract-xml-driver 1062 creates and invokes expat and the abstract-xml-driver 1062 provides class functions which are the recipients of the expat notifications corresponding to the parsed XML markup. The abstract-xml-driver 1062 also provides pure virtual member functions which must be specialized by derived classes (such as the generic-xml-driver 1064). A specialization of the abstract-xml-driver 1062 indirectly receives expat notifications via its implementations of the pure virtual member functions.

A member parser 1074 is provided by the abstract-xml-driver 1062. The parser 1074 is of type XML_parser. The XML_parser is defined by expat; the parser 1074 is an opaque pointer to the expat parser.

A boolean member failed 1076 is provided by the abstract-xml-driver 1062. The member failed 1076 represents the parse status; if any failure has been detected, the failed 1076 will be true.

A constructor 1078 is provided by the abstract-xml-driver 1062. The constructor 1078 initializes the parser 1074 to null and the member failed 1076 to false.

A virtual destructor 1080 is provided by the abstract-xml-driver 1062. The destructor 1080 is empty.

A member function parse 1082 is provided by the abstract-xml-driver 1062. The parse 1082 directs the abstract-xml-driver 1062 to process XML markup from a supplied file handle. The parse 1082 is supplied with a file handle representing the file from which the markup shall be read. The parse 1082 returns a boolean value indicating the success of the parse. The parse 1082 is considered in detail below.

A class function start-tag-handler 1084 is provided by the abstract-xml-driver 1062. The start-tag-handler 1084 receives expat notifications indicating the start tag of a tagged element. The start-tag-handler 1084 is a class member, hence a global function (as distinguished from a member function). It is thus invoked without a responsive instance of the abstract-xml-driver 1062. The start-tag-handler 1084 is supplied with a first argument of pointer to void, representing arbitrary client data. The start-tag-handler 1084 is supplied with a second argument of type expat-name 1068, representing the tag name. The start-tag-handler 1084 is supplied with a third argument of type expat-attributes 1070, representing the tag attributes, if any. The start-tag-handler 1084 returns void; expat does not accept any returned information from a notification. The start-tag-handler 1084 is considered in detail below.

A class function end-tag-handler 1086 is provided by the abstract-xml-driver 1062. The end-tag-handler 1086 receives expat notifications indicating the end of a tagged element. The end-tag-handler 1086 is a class member, hence a global function (as distinguished from a member function). It is thus invoked without a responsive instance of the abstract-xml-driver 1062. The end-tag-handler 1086 is supplied with a first argument of pointer to void, representing arbitrary client data. The end-tag-handler 1086 is supplied with a second argument of type expat-name 1068, representing the tag name. The end-tag-handler 1086 returns void; expat does not accept any returned information from a notification. The end-tag-handler 1086 is considered in detail below.

A class function characters-handler 1088 is provided by the abstract-xml-driver 1062. The characters-handler 1088 receives expat notifications indicating the receipt of textual content. The characters-handler 1088 is a class member, hence a global function (as distinguished from a member function). It is thus invoked without a responsive instance of the abstract-xml-driver 1062. The characters-handler 1088 is supplied with a first argument, of pointer to void, representing arbitrary client data. The characters-handler 1088 is supplied with a second argument, of type expat-buffer 1072, a buffer holding the parsed textual content. The characters-handler 1088 is supplied with a third argument, of type int, indicating the length of the supplied buffer. The characters-handler 1088 returns void; expat does not accept any returned information from a notification. The characters-handler 1088 is considered in detail below.

A pure virtual member function start-tag 1090 is provided by the abstract-xml-driver 1062. The start-tag 1090 must be provided by specializations of the abstract-xml-driver 1062. The start-tag 1090 is the indirect recipient of the expat notification of the start tag of a tagged element. The start-tag 1090 receives a first argument of type expat-name 1068 indicating the tag name. The start-tag 1090 receives a second argument of type expat-attributes 1070, indicating the tag attributes, if any. The start-tag 1090 returns void.

A pure virtual member function end-tag 1092 is provided by the abstract-xml-driver 1062. The end-tag 1092 must be provided by specializations of the abstract-xml-driver 1062. The end-tag 1092 is the indirect recipient of an expat notification of the end of a tagged element. The end-tag 1092 receives an argument of type expat-name 1068, indicating the tag name. The end-tag 1092 returns void.

A pure virtual member function characters 1094 is provided by the abstract-xml-driver 1062. The characters 1094 must be provided by specializations of the abstract-xml-driver 1062. The characters 1094 is the indirect recipient of an expat notification of textual content. The characters 1094 receives a first argument of type expat-name 1068, a buffer holding the parsed textual content. The characters 1094 receives a second argument of type int, indicating the length of the supplied buffer. The characters 1094 returns void.

A member function fail 1096 is provided by the abstract-xml-driver 1062. The fail 1096 provides a convenient mechanism for reporting parse failure. The fail 1096 receives an argument of type text 1010, which may be used to formulate a status message. The fail 1096 sets the failed 1076 to non-zero, indicating the failure status of the parse. The fail 1096 returns zero to indicate failure.

3.1.1 Abstract XML Driver Start Tag Handler

FIG. 7 depicts an examplary embodiment of an implementation of the class function start-tag-handler 1084, drawn from the class abstract-xml-driver 1062. The start-tag-handler 1084 receives a first argument user-data 1098, of pointer to void, representing client data. The start-tag-handler 1084 receives a second argument tag 1100, of expat-name 1068, representing the tag name. The start-tag-handler 1084 receives a third argument attribute-array 1102, of type ExpatAttributes, representing the tag attributes, if any. A driver 1104, an instance of the abstract-xml-driver 1062, is obtained by slam-casting the user-data 1098. The validity of the slam-cast depends on the parser 1074 having had properly assigned client data. The member failed 1076 for the driver 1104 is examined to determine whether the parse has failed yet. If the parse is successful so far, the driver 1104 is notified by the start-tag 1090, with arguments the tag 1100 and the attribute-array 1102. Thus the static, global-level handler converts the generic supplied client data to an instance of the abstract-xml-driver 1062 and dispatches the supplied name and attributes to the start-tag 1090.

3.1.2 Abstract XML Driver End Tag Handler

FIG. 8 depicts an examplary embodiment of the class function end-tag-handler 1086, drawn from the class abstract-xml-driver 1062. The end-tag-handler 1086 receives a first argument user-data 1106, of pointer to void, representing arbitary client data. The end-tag-handler 1086 receives a second argument tag 1108, of expat-name 1068, representing the tag name. A driver 1110, an instance of the abstract-xml-driver 1062, is obtained by slam-casting the user-data 1106. The member failed 1076 for the driver 1110 is examined to determine whether the parse has failed yet. If the parse is successful so far, the driver 1110 is notified by the end-tag 1092 with argument the tag 1108.

3.1.3 Abstract XML Driver Characters Handler

FIG. 9 depicts an examplary embodiment of the class function characters-handler 1088, drawn from the class abstract-xml-driver 1062. The characters-handler 1088 receives a first argument user-data 1112, of pointer to void, representing arbitary client data. The characters-handler 1088 receives a second argument string 1114, of type expat-buffer 1072, referencing a buffer of textual data. The characters-handler 1088 receives a third argument length 1116, of type int, indicating the length of data in the string 1114. A driver 1118, an instance of the abstract-xml-driver 1062, is obtained by slam-casting the user-data 1112. The member failed 1076 for the driver 1118 is examined to determine whether the parse has failed yet. If the parse is successful so far, the driver 1118, is notified by the characters 1094, with arguments the string 1114 and the length 116.

3.1.4 Abstract XML Driver Parse

FIG. 10 depicts an examplary embodiment of the member function parse 1082, drawn from the class abstract-xml-driver 1062. The parse 1082 is supplied with an argument file-handle 1120, indicating the source of the markup to be processed. The parser 1074 is created using the expat service "XML_ParserCreateNS". The namespace variant of the expat parser is utilitized for maximum generality in processing XML. Tag names and attributes incorporating XML name space directives will be expanded by expat to their canonical forms. If the parser creation failed, failure is noted and zero is returned to indicate parse failure. The responsive instance of the abstract-xml-driver 1062 is provided to the parser 1074 as client data, using the expat service "XML_SetUserData". The start-tag-handler 1084 and the end-tag-handler 1086 are provided to the parser 1074 via the expat service "XML_SetElementHandler" for use as recipients of expat notifications on start tag and end tag, respectively. The characters-handler 1088 is provided to the parser 1074 via the expat service "XML_SetCharacterDataHandler", for use by expat to receive notifications of textual content. A buffer size buffer-size 1122 is defined. A buffer 1124 is defined, sized according to the buffer-size 1122. The buffer 1124 will be used to sequentially receive text from the supplied file-handle 1120, and to relay text to the parser 1074.

An unbounded loop is designated to encompass the reading of arbitrary-length markup. The standard C library service "fread" is invoked to read into the buffer 1124 from the supplied file-handle 1120. The number of bytes actually read is captured in a bytes-read 1126. The standard C library service "ferror" is invoked to determine whether the supplied file-handle 1120 has become invalid. Should the file-handle 1120 have reported an error, read failure is reported and the loop is broken. The end-of-file status on file-handle 1120 is determined using the standard C library service "feof". The end-of-file status is captured in an integer done 1128, which is used by expat and consulted below regarding termination of the loop. The expat service "XML_Parse" is invoked for the parser 1074, the buffer 1124, and the done 1128. If the XML_Parse indicated failure, the error is reported and the loop is broken. If any failure has been indicated (e.g., by one of the expat client notifications), the failure is noted and the loop is broken. The loop is broken if the done 1128 indicates that end-of-file has been reached.

After the loop, the parser 1074 is freed using the expat service "XML_ParserFree". The parser 1074 is assigned null, reflecting that after being freed, the parser 1074 is no longer valid. The parse 1082 returns the inversion of the member failed 1076, indicating the success of the parse.

3.2 Generic XML Driver

FIG. 11 depicts an examplary embodiment of the class generic-xml-driver 1064. The generic-xml-driver 1064 derives from the class abstract-xml-driver 1062. The generic-xml-driver 1064 is a template parameterized by a 1130 and an 1132. The 1130 is required to implement the client interface defined by the model 1006 from the interface 1002. Likewise, the 1132 is required to implement the client interface defined by the element 1008 from the interface 1002. The generic-xml-driver 1064 has base class the abstract-xml-driver 1062; thus it is required to implement the pure virtual member functions that are defined by the abstract-xml-driver 1062. An instantiation of the generic-xml-driver 1064, characterized by particular specializations of the model 1006 and the element 1008, may be invoked with the parse 1082 by virtue of its specialization of the abstract-xml-driver 1062. In carrying out the abstract operations defined by the abstract-xml-driver 1062 on its parameters, the generic-xml-driver 1064 delivers the client requests that comprise the interface 1002 to the client implementations of the model 1006 and element 1008. To use the interface 1002, a client must provide specializations of the model 1006 and the element 1008. To process XML markup, the client need only instantiate a generic-xml-driver 1064 with the client's model 1006 and element 1008 specializations as parameters.

The generic-xml-driver 1064 provides several data members. A member model 1134 is provided by the generic-xml-driver 1064. The model 1134 is of type 1130. The model 1134 is a client implementation of the model 1006. A member stack 1136 is provided by the generic-xml-driver 1064. The stack 1136 is stack of instances of the 1132. The stack is a well-known data structure which manages a sequence in last-in, first-out order, providing push, pop, and top operations which respectively add a last element to the stack, remove the last element from the stack, and access but not remove the last element from the stack.

The generic-xml-driver 1064 provides two factory member functions. A constructor 1138 is provided by the generic-xml-driver 1064. The constructor 1138 receives an argument of 1130, which serves to initalize the model 1134. A destructor 1140 is provided by the generic-xml-driver 1064. The destructor 1140 is empty.

The generic-xml-driver 1064 provides specializations of the pure virtual expat notifications defined by the base abstract-xml-driver 1062. A member function start-tag 1142 is provided by the generic-xml-driver 1064. The start-tag 1142 processes expat notifications indicating the start tag of a tagged element. The start-tag 1142 specializes the start-tag 1090. The start-tag 1142 receives a first argument of expat-name 1068, indicating the name of the tagged element. The start-tag 1142 receives a second argument of expat-attributes 1070, representing the attributes of the tagged element. The start-tag 1142 is considered in detail below.

A member function end-tag 1144 is provided by the generic-xml-driver 1064. The end-tag 1144 processes expat notifications indicating the end of a tagged element. The end-tag 1144 specializes the end-tag 1092. The end-tag 1144 receives an argurment of expat-name 1068, indicating the name of the tagged element. The end-tag 1144 is considered in detail below.

A member function characters 1146 is provided by the generic-xml-driver 1064. The characters 1146 processes expat notifications indicating textual content. The characters 1146 receives a first argument of expat-buffer 1072, containing the textual content. The characters 1146 receives a second argument of type int, indicating the amount of data in the supplied expat-buffer 1072. The characters 1146 is considered in detail below.

A member function push 1148 is provided by the generic-xml-driver 1064. The push 1148 receives an argument of 1132. The supplied 1132 is pushed onto the stack 1136.

A member function pop 1150 is provided by the generic-xml-driver 1064. The pop 1150 removes and returns the topmost 1132 from the stack 1136.

A member function top 1152 is provided by the generic-xml-driver 1064. The top 1152 is of type 1132. The pop 1150 returns the topmost 1132 from the stack 1136, but does not change the stack 1136.

A member function is-empty 1154 is provided by the generic-xml-driver 1064. The is-empty 1154 returns a boolean value indicating whether the stack 1136 is empty.

3.2.1 Generic XML Driver Start-Tag

FIG. 12 depicts an examplary embodiment of the member function start-tag 1142, drawn from the class generic-xml-driver 1064. The start-tag 1142 receives a first argument tag 1156, of expat-name 1068, indicating the tag name. The start-tag 1142 receives a second argument attribute-array 1158, of expat-attributes 1070, representing the tag attributes, if any. A tagged element has been detected. An element 1160, an instance of the 1132, is created by request of the construct-element 1012 of the model 1134 with argument tag 1156. If the requested element 1160 is null, the failure is noted and the member function returns.

A string 1162 is initialized to the attribute-array 1158. While the string 1162 is non-zero, the next attribute key, value pair is indirectly visited from the attribute-array 1158 via the string 1162. An attribute of tagged element has been detected. A key 1164 is obtained. A value 1166 is obtained. The accept-attribute 1024 is requested of the element 1160 with arguments key 1164, value 1166, and model 1134. If the accept-attribute 1024 request fails, the failure is noted, the element 1160 is deleted, and the member function returns.

When all the attributes have been processed, hence the absence of additional attributes has been detected, the configure 1026 is requested of the element 1160 with argument model 1134. If the configure 1026 fails, the failure is noted, the element 1160 is deleted and the member function returns. Otherwise, the configured element 1160 is pushed onto the stack 1136 using the push 1148. The stack 1136 maintains an association between the markup element which is being processed and the element object to which requests shall be directed.

3.2.2 Generic XML Driver End-Tag

FIG. 13 depicts an examplary embodiment of the member function end-tag 1144, drawn from the class generic-xml-driver 1064. The end-tag 1144 receives an argument of type expat-name 1068. The completion of a markup element has been detected; no further markup elements or textual content remain in the body of the completed markup element. The topmost 1132 from the stack 1136 is popped via pop 1150, and assigned to an element 1168. Popping the element object corresponding to the completed markup element maintains the assocation between the markup element being processed and the element object to which requests shall be directed. The commit 1032 is requested of the element 1168 with argument the model 1134. If the commit 1032 fails, the failure is noted, the element 1168 is deleted, and the end-tag 1144 returns.

The presence of an element on the stack is determined via the top 1152. If there's an element on the stack, the accept-element 1028 is requested of the top 1152 with arguments the element 1168 and the model 1134. An element object corresponding to a parent markup element is top-most on the stack, and the recently popped element object corresponds to a child markup element. If the accept-element 1028 fails, the failure is noted, the element 1168 is deleted, and the end-tag 1144 returns.

Otherwise, in the case where there's no element on the stack, the popped 1132 corresponds to a root tagged element. The accept-root-element 1014 is requested of the model 1134 with argument the element 1168. If the accept-root-element 1014 invocation fails, the failure is noted, the element 1168 is deleted, and the end-tag 1144 returns.

3.2.3. Generic XML Driver Characters

FIG. 14 depicts an examplary embodiment of the member function characters 1146, drawn from the class generic-xml-driver 1064. The characters 1146 receives a first argument string 1170, of expat-buffer 1072. The characters 1146 receives a second argument length 1172, of int. A local text 1174, of text 1010, is initialized from the string 1170 and the length 1172. The presence of an 1132 on the stack is determined using the top 1152. If an 1132 is present, an instance of textual content has been detected, and the accept-text 1030 is requested of the 1132 obtained from the top 1152, with arguments text 1174 and model 1134. If the accept-text 1030 invocation fails, the failure is noted and the characters 1146 returns.

Otherwise, there's no topmost stack element, so a root instance of textual content has been detected, and hence the supplied text is directed to the model. The accept-root-text 1016 is requested of the model 1134 with argument the text 1174. If the accept-root-text 1016 invocation fails, the failure is noted and the characters 1146 returns.

4 Trivial Client Implementation

FIG. 15 depicts an examplary embodiment of a trivial-module 1176, providing a trivial client implementation of the interface 1002. The trivial-module 1176 thus refines the client 1004. A class trivial-element 1178 provides a client implementation of the element 1008. A class trivial-model 1180 provides a client implementation of the model 1006.

In some subsequent figures depicting classes, the C++ keyword "struct" is used in class definitions. This usage indicates that all of the depicted members and member functions have public scope (by default, members of a C++ class declared as a struct have public scope). In an alternative embodiment, the "class" keyword could be used, in which case, by default, members would have private scope. The struct convention is used here to avoid cluttering the depictions with access member functions. In an alternative embodiment, members would be private, with public member functions provided to get and set those data members, where necessary. Most member functions would remain public, but certain member functions could be made private where their access is not required outside the class implementation.

4.1 Trivial Element

FIG. 16 depicts an examplary embodiment of the class trivial-element 1178, which provides a trivial client implementation of the element 1008. A member function accept-attribute 1182 responds to the request accept-attribute 1024. The supplied attribute is ignored; boolean true is returned. A member function configure 1184 responds to the request configure 1026. Boolean true is returned. A member function accept-element 1186 responds to the request accept-element 1028. An argument element 1188 provides the instance of the trivial-element 1178 which is subject to acceptance. The supplied element 1188 is deleted. Boolean true is returned. A member function accept-text 1190 responds to the request accept-text 1030. The supplied text is ignored. Boolean true is returned. A member function commit 1192 responds to the request commit 1032. Boolean true is returned.

4.2 Trivial Model

FIG. 17 depicts an examplary embodiment of the class trivial-model 1180, which provides a trivial client implementation of the model 1006. A member function construct-element 1194 responds to the request accept-root-element 1014. An instance of the trivial-element 1178 is constructed and returned. A member function accept-element 1196 responds to the request accept-root-element 1014. An argument element 1198 provides the instance of the trivial-element 1178 which is subject to acceptance. The supplied element 1198 is deleted. Boolean true is returned. A member function accept-text 1200 responds to the request accept-root-text 1016. The supplied text is ignored. Boolean true is returned.

4.3 Trivial Client Applications

The trivial-module 1176 is useful as a validator of markup structure. The trivial-module 1176 is also useful as a cut-and-paste starting point for a more elaborate implementation of the client 1004. In languages which do not provide facilities for generic programming (templates), the trivial-module 1176 may provide base classes suitable for deriviation by a non-trivial implementation of the client 1004. In an alternative embodiment in C++ which avoids templates, an implementation of the driver 1000 would direct requests to instances of the trivial-module 1176. A non-trivial client would derive from the classes of the trivial-module 1176, with specialized member functions responsive to the requests of the interface 1002.

5 RSS Subset Client

The advantages of the interface 1002 may be illustrated by an example of a simple but useful application processing RSS, a family of popular syndication markup languages. RSS is used by many web content providers to summarize and promote their web offerings. The RSS family of languages is defined by several standards of varying specificity for distribution of syndication information. A useful RSS reference is the book "Developing Feeds with RSS and Atom," by Ben Hammersley, O'Reilly, 2005, ISBN 0-596-00881-3. In RSS, a feed includes one or more channels. A channel includes one or more items. Each of the items may include a title, a link, a description, and many other descriptive elements. A very common RSS application is to process one or more RSS feeds and produce an HTML summary page which incorporates descriptions and links to the syndicated content. Such an application may conveniently ignore many of the elements in the feed.

FIG. 18 depicts an examplary embodiment of a module 1202, providing a client implementation of the interface 1002 suitable for an application processing a subset of RSS. FIG. 18 uses a shorthand textual notation for depiction of a family of related classes. Classes are indicated by a name and a balanced pair of curly brackets. Inheritance is indicated by containment. A child class is enclosed within the brackets of a parent class, indicating that the child class publicly inherits from the parent class.

A class model 1204 specializes the model 1006. An instance of the model 1204 encapsulates an application-specific object-oriented data structure representing one or more RSS feeds. A class element 1206 specializes the element 1008. An instance of the element 1206 corresponds to an individual tagged element. The element 1206 provides a generalized base class from which classes corresponding to specific tagged elements are derived.

A class field 1208 inherits from the element 1206. An instance of the field 1208 represents a unit of descriptive information pertaining to a channel or an item. A class title 1210 inherits from the field 1208. An instance of the title 1210 represents the title of a channel or an item. A class link 1212 inherits from the field 1208. An instance of the link 1212 represents a link associated with a channel or an item. A class description 1214 inherits from the field 1208. An instance of the description 1214 represents a description assocated with a channel or an item.

A class composite 1216 inherits from the element 1206. An instance of the composite 1216 represents a composite element of a feed, including a channel or an item. A class item 1218 inherits from the composite 1216. An instance of the item 1218 represents an item in a channel. A class channel 1220 inherits from the composite 1216. An instance of the channel 1220 represents a channel in a feed. A class feed 1222 inherits from the element 1206. An instance of the feed 1222 represents an entire feed.

A class html-writer 1224 provides a transformation from RSS to HTML. A instance of the html-writer 1224 processes an instance of the model 1204, writing an HTML file which summarizes the RSS represented by the model instance.

5.1 RSS Subset Client Model

FIG. 19 depicts an examplary embodiment of the class model 1204. The class model 1204 makes use of a class factory 1226. An instance of the factory 1226 is configured to associate a particular constructor with a supplied tag name.

A member factory 1228, an instance of the factory 1226, constructs instances of the element 1206 in response to tag names. A sequence member feeds 1230 accumulates instances of the feed 1222 which have been detected in processing markup.

A destructor 1232 is responsible for deletion of the accumulated instances of the feed 1222 which are collected in the feeds 1230.

A member function construct-element 1234 provides the construct-element 1012. The construct-element 1234 uses the factory 1228 to attempt to construct an instance of the element 1206 corresponding to the supplied text. If the factory 1228 fails, an instance of the field 1208 is constructed.

A member function accept-element 1236 provides the accept-root-element 1014. The accept-element 1236 attempts to accumulate the supplied element to the feeds 1230; the accumulation only succeeds if the supplied element is an instance of the feed 1222. If the accumulation fails, the supplied element is deleted.

A member function accept-text 1238 provides the accept-root-text 1016. The accept-text 1238 always succeeds, ignoring the supplied root textual content.

5.2 RSS Subset Client Elements

FIG. 20 depicts the class element 1206. A member function accept-attribute 1240 provides the accept-attribute 1024. The supplied attribute is ignored. A member function configure 1242 provides the configure 1026. No action is taken. A member function accept-element 1244 provides the accept-element 1028. The supplied element is deleted. A member function accept-text 1246 provides the accept-text 1030. The supplied text is ignored. A member function commit 1248 provides the commit 1032. No action is taken. All of these member functions may be overridden by specializations of the element 1206, as necessary.

A member function put-model-feed 1250 provides a mechanism by which an instance of the model 1204 may attempt to accumulate an instance of the feed 1222 in the model's feeds 1230. The model requests the put-model-feed 1250 of an instance of the element 1206, providing itself as the argument. By default, an instance of the element 1206 may not accumulate itself; thus the default implementation shown here returns zero, indicating failure. However, if the supplied element instance specializes to an instance of the feed 1222, the specialized feed instance may accumulate itself. The class feed 1222 provides a specialization of the put-model-feed 1250 which performs the accumulation. This is a convenient type-safe method of achieving a downcast (i.e. a run-time specialization); it's an example of the object-oriented technique of double-dispatch, a valuable discussion of which may be found in the book "More Effective C++", by Scott Meyers, Addison-Wesley, 1996, ISBN 0-201-63371-X, pp. 228-251.

A member function put-feed-channel 1252 provides a mechanism by which an instance of the feed 1222 may attempt to accumulate an instance of the channel 1220. A double-dispatch technique as described above is used. A member function put-channel-item 1254 provides a mechanism by which an instance of the channel 1220 may attempt to accumulate an instance of the item 1218. A double-dispatch technique as described above is used. A member function put-field 1256 provides a mechanism by which an instance of the composite 1216 may attempt to accumulate an instance of the field 1208. A double-dispatch technique as described above is used.

FIG. 21. depicts an examplary embodiment of the class feed 1222. An instance of the feed 1222 corresponds to a feed tagged element, consisting of one or more channels. A sequence member channels 1258 accumulates instances of the channel 1220.

A member function accept-element 1260 provides the accept-element 1028. The accept-element 1260 invokes the put-feed-channel 1252, which, if successful, will accumulate a channel to the channels 1258. Failing the put-feed-channel 1252, the suppled element is deleted.

A member function put-model-feed 1262 successfully specializes the double-dispatch of the put-model-feed 1250, resulting in the accumulation of the feed 1222 into the supplied instance of the model 1204.

A destructor 1264 deletes the constitituents of the channels 1258.

FIG. 22, depicts an examplary embodiment of the class composite 1216 along with its specializations, the item 1218, and the channel 1220.

The class composite 1216 specializes the element 1206. A member title 1266, an instance of the title 1210, represents the title element in a composite element. A member link 1268, an instance of the link 1212, represents the link element in a composite element. A member description 1270, an instance of the composite 1216, represents a description element in a composite element. A destructor 1272 disposes of the field members.

The class channel 1220 specializes the composite 1216. A sequence member items 1274 accumulates instances of the item 1218.

A member function accept-element 1276 provides the accept-element 1028. The accept-element 1276 invokes the put-channel-item 1254, which, if successful, will accumulate an item to the items 1274. Failing the put-channel-item 1254, the accept-element 1276 invokes the put-field 1256, which, if successful, set one of the field members of the composite 1216. Failing the put-field 1256, the supplied element is deleted.

A member function put-feed-channel 1278 successfully specializes the double-dispatch of the put-feed-channel 1252, resulting in the accumulation of the instance of the channel 1220 into the channels 1258 of the supplied instance of the feed 1222.

A destructor 1280 deletes the constituents of the items 1274.

The class item 1218 specializes the composite 1216. A member function accept-element 1282, specializing the accept-element 1028, invokes the put-field 1256, which, if successful, will set one of the field members of the composite 1216.

A member function put-channel-item 1284 successfully specializes the double-dispatch of the put-channel-item 1254, resulting in the accumulation of the instance of the item 1218 to the items 1274 of the supplied instance of the channel 1220.

FIG. 23 depicts an examplary embodiment of the class field 1208, along with its specializations, the title 1210, the link 1212, and the description 1214. The class field 1208 specializes the element 1206. The field 1208 provides a default element which is used for any tagged element which is not specifically identified. A member text 1286 collects text making up the content of the field. A member function accept-text 1288 responds to the accept-text 1030, specializing the accept-text 1246. The supplied text is appended to the text 1286.

The class title 1210 specializes the field 1208. A member function put-field 1290 specializing the put-field 1256, successfully resolves a double-dispatch in which a specialized instance of the title 1210 is made available to an instance of the composite 1216; the instance of the title 1210 is assigned to the title 1266 of the supplied instance of the composite 1216.

The class link 1212 specializes the field 1208. A member function put-field 1292, specializing the put-field 1256, successfully resolves a double-dispatch in which a specialized instance of the link 1212 is made available to an instance of the composite 1216; the instance of the link 1212 is assigned to the link 1268 of the supplied instance of the composite 1216.

The class description 1214 specializes the field 1208. A member function put-field 1294, specializing the put-field 1256, successfully resolves a double-dispatch in which a specialized instance of the description 1214 is made available to an instance of the composite 1216; the instance of the description 1214 is assigned to the description 1270 of the supplied instance of the composite 1216.

5.3 RSS Html Writer

FIG. 24 depicts an examplary embodiment of the class html-writer 1224. A constructor 1296 accepts an instance of the model 1204 and a text sink to which HTML should be written. The constructor 1296 writes boilerplate HTML content surrounding the channel and item content. The constructor 1296 invokes a member function view-feed 1298 for each instance of the feeds 1230.

The member function view-feed 1298 invokes a member function view-channel 1300 for each instance of the channels 1258.

The member function view-channel 1300 writes a HTML header and anchor hyperlink from the title 1266 and the link 1268 of the supplied instance of the channel 1220. An HTML paragraph is written from the description 1270 of the supplied instance of the channel 1220. The member function view-channel 1300 invokes a member function view-item 1302 for each instance of the items 1274.

The member function view-item 1302 writes a HTML header and anchor hyperlink from the title 1266 and the link 1268 of the supplied instance of the item 1218. An HTML paragraph is written from the description 1270 of the supplied instance of the item 1218.

5.4 RSS Subset HTML Writer Application

FIG. 25 depicts an examplary embodiment of an application r4s-html-writer 1304. The r4s-html-writer 1304 demonstrates of the use of the module 1202 and the generic-xml-driver 1064. The r4s-html-writer 1304 writes a single HTML page for a collection of one or more RSS markup files provided on the command line. For clarity, error-checking has been suppressed in this particular embodiment. In an alternative embodiment, the return values would be examined to detect errors.

A local model 1306, an instance of the model 1204, is constructed. A local driver 1308 is constructed. The driver 1308 is an instance of the generic-xml-driver 1064, parameterized by the model 1204 and the element 1206. The driver 1308 is initialized with the model 1306. Each command-line argument in the argv array is processed; a file handle is opened for the argument. This is a fallible invocation. The parse 1082 is requested of the driver 1308, with the file handle as an argument. This is also fallible invocation. The file handle is closed after parsing. A text file sink is constructed. The text file sink and the model 1306 are supplied to the construction of a local writer 1310, an instance of the html-writer 1224. The writer 1310 writes the product HTML to the supplied sink. A successful outcome is indicated by a zero return code.

FIG. 26 depicts a sample RSS document. FIG. 27 depicts an examplary embodiment of HTML produced by the operation of the r4s-html-writer 1304 on the sample RSS document.

I claim:

1. A computer-implemented method, executed by a central processing unit (CPU), for application-specific object-oriented processing of a markup by a model instance associated with a class Model and a plurality of element instances, each of said plurality of element instances associated with a class Element, said class Model is configured to process instances of said class Element, comprising the steps of:

responding to a construct-element request, said construct-element request is a member function of said class Model, dispatched to said model instance, in which a tag name is provided, said tag name corresponding to a tagged element from said markup, constructing a new element instance, one of said plurality of element instances, according to application-specific requirements as determined according to said tag name, performing application-specific processing as required, and returning said constructed new element instance;

responding to an accept-attribute request, said accept-attribute request is a member function of said class Element, dispatched to one of said plurality of element instances, in which an attribute is provided, said attribute corresponding to a markup attribute of a tagged element from said markup, and performing application-specific processing as required;

responding to an accept-element request, said accept-element request is a member function of said class Element, dispatched to one of said plurality of element instances, in which a child element instances, one of said plurality of element instances, is provided, and performing application-specific processing as required; and responding to an accept-root-element request, said accept-root-element request is a member function of said class Model, dispatched to said model instance, in which a root element instance, one of said plurality of element instances, is provided, and performing application-specific processing as required.

2. The computer-implemented method of claim 1, further comprising the step of:

responding to a configure request, said configure request is a member function of said class Element, dispatched to one of said plurality of element instances, said configure request indicating that no further is for said accept-attribute request will be dispatched to the one of said plurality of element instances, and performing application-specific processing as required.

3. The computer-implemented method of claim 1, further comprising the step of:

responding to a commit request, said commit request is a member function of said class Element, dispatched to one of said plurality of element instances, said commit request indicating that no further is for said accept-element request will be dispatched to the one of said plurality of element instances, and performing application-specific processing as required.

4. The computer-implemented method of claim 1, further comprising the step of:

responding to an accept-text request, said accept-text request is a member function of said class Element, dispatched to one of said plurality of element instances, in which an instance of textual content from said markup is provided, and performing application-specific processing as required.

5. The computer-implemented method of claim 1, further comprising the step of:

responding to an accept-root-text request, said accept-root-text request is a member function of said class Model, dispatched to said model instance, in which an instance of textual content from said markup is provided, and performing application-specific processing as required.

6. A computer-implemented method, executed by a central processing unit (CPU), for processing markup to dispatch object-oriented is to a model instance associated with a Model class, and a plurality of element instances, each of said element instances associated with an Element class, said class Model is configured to process instances of said class Element, comprising the steps of:

detecting a tagged element of said markup, said tagged element including a tag name, dispatching to said model instance a construct-element request, said construct-element request is a member function of said Model class, in which said tag name is provided, and from which a newly-constructed element instance is returned, and associating said newly-constructed element instance with said tagged element of said markup;

detecting an attribute of another tagged element of said markup, determining an associated element instance, one of said plurality of element instances, said associated element instance previously associated with said another tagged element, and dispatching to said associated element instance an accept-attribute request, said accept-attribute request is a member function of said Element class, in which said markup attribute is provided;

detecting a child tagged element of said markup and a corresponding parent tagged element of said markup, determining a child element instance, one of said plurality of element instances, said child element instance previously associated with said child tagged element, determining a parent element instance, one of said plurality of element instances, said parent element instance previously associated with said parent tagged element, dispatching to said parent tagged element an accept-element request, said accept-attribute request is a member function of said Element class, in which said child element instance is provided; and detecting a root-level tagged element of said markup, determining an associated element instance, one of said plurality of element instances, said associated element instance previously associated with said tagged element, and dispatching to said model instance an accept-root-element request, said accept-root-element is a member function of said Model class, in which said associated element instance is provided.

7. The computer-implemented method of claim 6, further comprising the step of:

detecting the absence of additional attributes of a tagged element of said markup, determining an associated element instance, one of said plurality of element instances, said associated element instance previously associated with said tagged element, and dispatching to said associated element instance a configure request, said configure request is a member function of said Element class.

8. The computer-implemented method of claim 6, further comprising the step of:

detecting a tagged element of said markup, determining an associated element instance, one of said plurality of element instances, said associated element instance previously associated with said tagged element, and dispatching to said associated element instance a commit request, said commit request is a member function of said Element class.

9. The computer-implemented method of claim 6, further comprising the step of:

detecting an instance of textual content from the body of a tagged element, determining an associated element instance, one of said plurality of element instances, said associated element instance previously associated with said tagged element, and dispatching to said associated element instance an accept-text request, said accept-text request is a member function of said Element class, in which said instance of textual content is provided.

10. The computer-implemented method of claim 6, further comprising the step of:

detecting an instance of root textual content, and dispatching to said model instance an accept-root-text request, said accept-root-text request is a member function of said Model class, in which said instance of textual content is provided.

11. A non-transitory computer-readable medium encoded with a computer program for application-specific object-oriented processing of a markup, said computer program comprising:

a model instance associated with a class Model;

a plurality of element instances, each of said plurality of element instances associated with a class Element, said class Model is configured to process instances of said class Element;

wherein said model instance is configured to respond to a construct-element request, said construct-element request is a member function of said class Model, in which a tag name is provided, said tag name corresponding to a tagged element from said markup, to construct a new element instance, one of said plurality of element instances, according to application-specific requirements as determined according to said tag name, to perform application-specific processing as required, and to return said constructed new element instance;

each of said plurality of element instances is configured to respond to an accept-attribute request, said accept-attribute request is a member function of said class Element, in which an attribute is provided, said attribute corresponding to a markup attribute of a tagged element from said markup, and to perform application-specific processing as required;

each of said plurality of element instances is further configured to respond to an accept-element request, said accept-element request is a member function of said class Element, in which a child element instance, one of said plurality of element instances, is provided, and to perform application-specific processing as required; and said model instance is further configured to respond to an accept-root-element request, said accept-root-element request is a member function of said class Model, in which a root element instance, one of said plurality of element instances, is provided, and to perform application-specific processing as required.

12. The non-transitory computer-readable medium encoded with a computer program of claim 11, wherein:

each of said plurality of element instances is further configured to respond to a configure request, said configure request is a member function of said class Element, and said configure request indicating that no further is for said accept- attribute request will be dispatched to each of said plurality of element instances, and to perform application-specific processing as required.

13. The non-transitory computer-readable medium encoded with a computer program of claim 11, wherein:

each of said plurality of element instances is further configured to respond to a commit request, said commit request is a member function of said class Element, and said commit request indicating that no further is for said accept-element request will be dispatched to each of said plurality of element instances, and to perform application-specific processing as required.

14. The non-transitory computer-readable medium encoded with a computer program of claim 11, wherein:

each of said plurality of element instances is further configured to respond to an accept-text request, said accept-text request is a member function of said class Element, in which an instance of textual content from said markup is provided, and to perform application-specific processing as required.

15. The non-transitory computer-readable medium encoded with a computer program of claim 11, wherein:

said model instance is further configured to respond to an accept-root-text request, said accept-root-text request is a member function of said class Model, in which an instance of textual content from said markup is provided, and to perform application-specific processing as required.

* * * * *